(12) United States Patent
Oren

(10) Patent No.: US 8,548,104 B2
(45) Date of Patent: Oct. 1, 2013

(54) RECEIVER WITH CONFIGURABLE CLOCK FREQUENCIES

(75) Inventor: Roy Oren, Magshimim (IL)

(73) Assignee: Siano Mobile Silicon Ltd., Kfar Netter (IL)

( * ) Notice: Subject to any disclaimer, the term of this patent is extended or adjusted under 35 U.S.C. 154(b) by 365 days.

(21) Appl. No.: 12/952,219

(22) Filed: Nov. 23, 2010

(65) Prior Publication Data

US 2012/0128107 A1  May 24, 2012

(51) Int. Cl.
*H04L 27/06* (2006.01)
(52) U.S. Cl.
USPC ............ 375/344; 375/327; 375/346; 375/376
(58) Field of Classification Search
USPC ................... 375/344, 327, 346, 376
See application file for complete search history.

(56) References Cited

U.S. PATENT DOCUMENTS

2007/0098089 A1* 5/2007 Li et al. .......................... 375/260
2011/0096864 A1* 4/2011 Yu ................................. 375/295

* cited by examiner

*Primary Examiner* — Kabir A Timory
(74) *Attorney, Agent, or Firm* — D. Kligler J.P. Services Ltd.

(57) ABSTRACT

A method includes, in a receiver that operates using multiple clock signals having respective clock frequencies, accepting a request to receive a target channel frequency. In response to the request, a set of preferred clock frequencies is calculated, which when applied by the receiver will cause the receiver to tune to the target channel frequency while satisfying a predefined criterion relating to interference caused by the clock signals. The target channel frequency is received by setting the clock signals to the preferred clock frequencies.

28 Claims, 2 Drawing Sheets

RECEIVER WITH CONFIGURABLE CLOCK FREQUENCIES

FIELD OF THE INVENTION

The present invention relates generally to communication systems, and particularly to receivers having configurable clock frequencies.

BACKGROUND OF THE INVENTION

Various communication applications use multi-band receivers that cover multiple wide spectral bands. Receivers of this sort are used, for example, in Mobile Digital Television (MDTV) applications. MDTV receiver chips for mobile communication terminals are offered, for example, by Siano Mobile Silicon Ltd. (Kfar Netter, Israel).

SUMMARY OF THE INVENTION

An embodiment of the present invention that is described herein provides a method, including:

in a receiver that operates using multiple clock signals having respective clock frequencies, accepting a request to receive a target channel frequency;

in response to the request, calculating a set of preferred clock frequencies, which when applied by the receiver will cause the receiver to tune to the target channel frequency while satisfying a predefined criterion relating to interference caused by the clock signals; and receiving the target channel frequency by setting the clock signals to the preferred clock frequencies.

In some embodiments, calculating the preferred clock frequencies includes executing, in response to the request, software code that searches over multiple combinations of the clock frequencies in order to identify the set of the preferred clock frequencies. In a disclosed embodiment, calculating the preferred clock frequencies includes evaluating frequencies of harmonic products of one or more of the clock frequencies, and verifying that the frequencies of the harmonic products meet the predefined criterion. In an embodiment, the predefined criterion specifies that all harmonic products of one or more of the clock frequencies, up to a given harmonic order, fall outside a predefined bandwidth of interest. The predefined bandwidth of interest may include an input bandwidth of the receiver.

Typically, calculation of the preferred clock frequencies is performed without a-priori storage of potentially preferred clock frequencies before accepting the request. In an embodiment, the receiver is fabricated on a single semiconductor die. In an alternative embodiment, the receiver is fabricated on two or more semiconductor dies that are packaged in a single device package. In another embodiment, the clock signals include at least one signal type selected from a group of types consisting of a local oscillator signal used for frequency conversion, a sampling clock used for sampling in an Analog to Digital Converter (ADC), a demodulation clock used for signal demodulation, and a system clock used for clocking digital circuitry in the receiver.

In some embodiments, the clock signals include a clock of an interface for communicating with a host, and calculating and setting the preferred clock frequencies include modifying the clock of the interface in order to meet the predefined criterion. Modifying the clock of the interface may include suspending communication with the host over the interface during modification of the clock of the interface. In an embodiment, setting the preferred clock frequencies includes setting a division factor of a divider that produces a local oscillator signal in the receiver. In some embodiment, the receiver includes a Mobile Digital Television (MDTV) receiver, and receiving the target channel frequency includes receiving a requested television channel.

There is additionally provided, in accordance with an embodiment of the present invention, a receiver, including:

one or more clock sources, which are configured to produce multiple clock signals at respective clock frequencies;

reception circuitry, which is configured to receive signals using the clock signals; and a processor, which is configured to accept a request to receive a target channel frequency, to calculate in response to the request a set of preferred clock frequencies, which when produced by the clock sources will cause the reception circuitry to tune to the target channel frequency while satisfying a predefined criterion relating to interference caused by the clock signals, and to set the clock sources to the preferred clock frequencies, so as to receive the target channel frequency.

There is also provided, in accordance with an embodiment of the present invention, a computer software product used in a receiver that operates using multiple clock signals having respective clock frequencies, the product including a computer-readable medium, in which program instructions are stored, which instructions, when read by a processor, cause the processor to accept a request to receive a target channel frequency, to calculate in response to the request a set of preferred clock frequencies, which when applied by the receiver will cause the receiver to tune to the target channel frequency while satisfying a predefined criterion relating to interference caused by the clock signals, and to set the clock signals to the preferred clock frequencies so as to receive the target channel frequency.

The present invention will be more fully understood from the following detailed description of the embodiments thereof, taken together with the drawings in which:

DETAILED DESCRIPTION OF EMBODIMENTS

Overview

Communication receivers often use various clock signals for carrying out signal reception functions. Clock signals may comprise, for example, Local Oscillator (LO) signals used for down-conversion, Analog-to-Digital Converter (ADC) sampling clocks, symbol or sample clocks extracted from the received signal, and/or clocks used for host interfaces. In many cases, however, clock signals may interfere with signal reception. Interference could occur, for example, when the frequency of a harmonic product (e.g., a harmonic or intermodulation) of one or more of the clock signals falls within the input bandwidth of the receiver. Clock-related interference is especially problematic in broadband receivers, in receivers having a large number of different clock signals, and in highly-integrated receivers in which Radio Frequency (RF) circuitry is located in close proximity to digital circuitry, such as receivers that are fabricated on a single die. Clock signals are a potential source of interference, however, in any receiver design.

Embodiments of the present invention that are described herein provide improved methods and systems for reducing interference caused by clock signals in receivers. In these methods and systems, a receiver sets its clock frequencies on the fly, e.g., in response to a request from a host to receive a certain target channel. In some embodiments, the receiver chooses clock frequencies that (i) tune to the desired target channel, and (ii) reduce interference caused by the clock signals. In an example embodiment, the receiver searches for a set of clock frequencies in which all harmonic products (e.g., harmonics and inter-modulation products), up to a certain order, fall outside the receiver input bandwidth.

The methods and systems described herein reduce or eliminate interference that may be caused by clock signals. Since these methods and systems identify and set the preferred clock frequencies on the fly, they are particularly suitable for broadband receivers and/or receivers having many different clock signals. In such receivers, it is often impractical to predefine and store a preferred combination of clock frequencies for each possible channel. Nevertheless, the disclosed techniques are useful in various other receiver types. Although the embodiments described herein refer mainly to Mobile Digital Television (MDTV) receivers, the methods and systems described herein can be used in any other suitable application.

System Description

Figure 1:
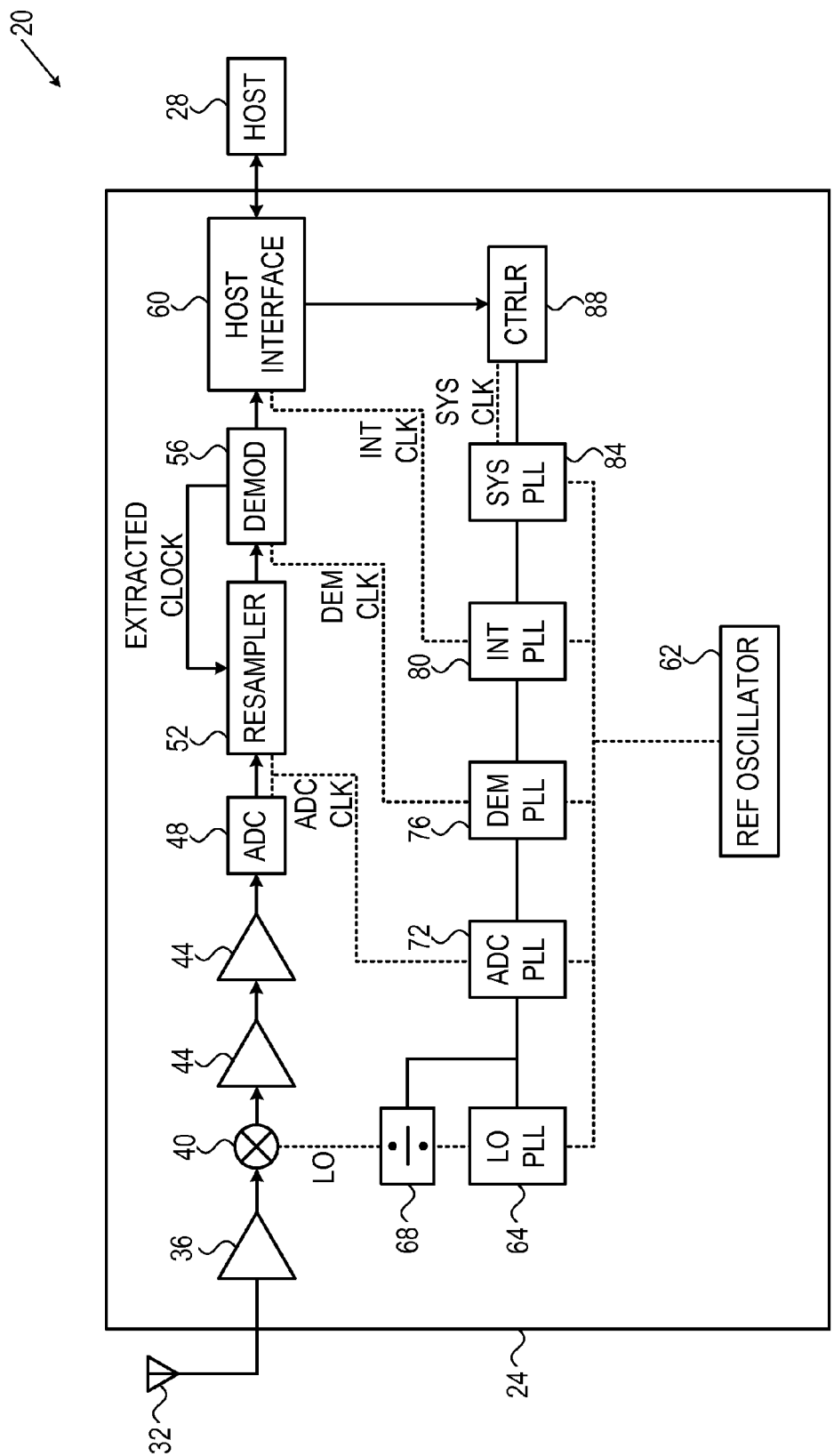
FIG. 1 is a block diagram that schematically illustrates a receiver having configurable clock frequencies, in accordance with an embodiment of the present invention.

FIG. 1 is a block diagram that schematically illustrates a receiver 20 having configurable clock frequencies, in accordance with an embodiment of the present invention. In the present example, receiver 20 comprises a Mobile Digital Television (MDTV) receiver that is fabricated on a single semiconductor die 24. In alternative embodiments, receiver 20 may be fabricated on multiple dies that are packaged together in a single device package (sometimes referred to as a System-in-Package—SiP), in a chipset, or using any other suitable configuration. In receivers of this sort, clock signals originating from digital receiver circuitry may interfere with the proper operation of receiver RF circuitry.

MDTV receiver 20 receives TV channels in response to requests from a host 28. Host 28 may comprise a processor of a mobile communication terminal such as a mobile phone, a processor in a mobile computing device such as a notepad computer or Personal Digital Assistant (PDA), or any other suitable type of host. In a typical application, host 28 sends a request to receiver 20 to start receiving a certain channel frequency, referred to herein as a target channel. In response to the request, receiver 20 tunes to the requested target channel, receives and decodes the channel and outputs the decoded data to host 28. In particular, receiver 20 chooses clock frequencies in a manner that reduces interference to the reception process, as will be described in detail below.

Receiver 20 may comprise a single-band or multi-band receiver. The frequencies covered by receiver 20 may comprise, for example, a Very High Frequency (VHF) band between 174-240 MHz, a Low VHF (LVHF) band between 48-174 MHz, an Ultra High Frequency (UHF) band between 470-854 MHz, an L-band between 1452-1492 MHz, and/or an S-band between 2635-2660 MHz. The receiver may cover all of these bands or any suitable subset of the bands, such as UHF only, UHF and S-band, VHF and UHF and L-band, or LVHF and UHF. The above-mentioned frequency bands are shown purely by way of example. In alternative embodiments, receiver may cover one or more bands having any suitable frequencies. The overall set of frequencies covered by receiver 20 is referred to as the receiver's input bandwidth.

Receiver 20 comprises an antenna 32 for receiving Radio frequency (RF) signals. The received signals are amplified by a Low-Noise Amplifier (LNA) 36. A mixer 40 mixes the output of LNA 36 with a certain Local Oscillator (LO) signal, so as to down-convert the RF signal to baseband. Amplifiers 44 amplify the baseband signal, and the signal is then sampled by an Analog-to-Digital Converter (ADC) 48, to produce a digital baseband signal. In an example embodiment, ADC 48 comprises a Sigma/Delta ($\Sigma/\Delta$) ADC.

A resampler 52 modifies the sampling rate of the digital signal. The resampler typically down-samples the signal, i.e., produces a signal whose output rate is lower than the input rate. In some embodiments, the ratio between the input and output rates of the resampler is not integer, in which case the resampler typically applies signal interpolation. In other words, the output samples produced by the resampler often correspond to sampling times that fall between the sampling times of the input signal.

In some embodiments, the resampler adjusts the rate of the digital signal according to an extracted clock signal, which is extracted from the signal following demodulation. In some embodiments, the clock signal used for outputting the samples from resampler 52 may comprise either the clock of ADC 48 or a clock used for demodulation (both defined and explained further below), such that not all clock cycles carry valid samples.

A demodulator 56 demodulates the digital signal that is produced by resampler 52, i.e., extracts the data that is conveyed by the signal. Demodulator 56 outputs the extracted data via a host interface 60 to host 28. In some embodiments, demodulator 56 recovers the symbol clock of the received signal (denoted "EXTRACTED CLOCK" in the figure) and feeds the extracted clock back to resampler 52.

In the present context, the processing chain comprising LNA 36, amplifiers 44, ADC 48, resampler 52, demodulator 56 and host interface 60 are referred to as a reception chain or reception circuitry. The reception chain of FIG. 1 is an example chain, which is shown purely for the sake of conceptual clarity. In alternative embodiments, any other suitable reception circuitry configuration can be used. For example, the reception circuitry may perform additional functions that are not shown in FIG. 1 for the sake of clarity, such as filtering gain control and equalization. A controller 88 manages and controls the various elements of receiver 20.

The reception chain of receiver 20 performs the different reception tasks using multiple clock signals. In the present example, the clock signals comprise an LO signal used by mixer 40 for down-conversion, a sampling clock of ADC 48 that is also provided to resampler 52, a demodulation clock that is provided to demodulator 56, an interface clock that drives host interface 60, and a system clock that drives controller 88 and possibly other digital circuitry in the receiver. In alternative embodiments, the reception chain may use any other suitable type of clock signal.

Receiver 20 comprises clock sources that generate the various clock signals used in the receiver. In the present example the clock sources comprise Phase Locked Loops (PLLs). Alternatively, the receiver may generate the multiple clock signals using one or more clock sources of any suitable type. In the embodiment of FIG. 1, an LO PLL 64 and a divider 68 generate the LO signal used by mixer 40, an ADC PLL 72 generates the sampling clock of ADC 48, a demodulation PLL 76 generates the demodulation clock for demodulator 56, an interface PLL 80 generates the interface clock for host interface 60, and a system PLL generates the system clock for controller 88.

In some embodiments, the clock sources in receiver 20 (PLLs 64, 72, 76, 80 and 84) are all locked to a single reference clock that is produced by a reference oscillator 62. In alternative embodiments, however, the clock sources are not necessarily locked to a common reference.

The receiver configuration shown in FIG. 1 is an example configuration, which is shown purely for the sake of conceptual clarity. In alternative embodiments, any other suitable receiver configuration can be used. Receiver elements that are not necessary for explanation of the disclosed techniques have been omitted from the figure for the sake of clarity. The different elements of receiver 20 may be implemented in software, in hardware or using a combination of hardware and software elements. In one embodiment, the entire receiver is implemented using circuitry that is disposed on a single semiconductor die. Alternatively, the receiver elements may be implemented using one or more Field-Programmable Gate Arrays (FPGAs), Application-Specific Integrated Circuits (ASICs), RF Integrated Circuits (RFIC) or any other suitable component types.

In some embodiment, controller 88 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

On-the-Fly Configuration of Clock Frequencies

The clock signals generated by the various PLLs in receiver 20 may cause interference to signal reception. For example, if a strong harmonic or inter-modulation product of one or more clock signals were to fall within the input bandwidth of the receiver, then this product will potentially degrade the receiver performance. Depending on the frequency and amplitude of the interfering product, the interference may comprise, for example, some degradation in Signal to Noise Ratio (SNR) or Bit Error Rate (BER), complete blockage of the receiver front end, or various other forms of interference.

In some embodiments, controller 88 of receiver 20 sets the frequencies of the clock signals in a manner that reduces interference. The clock frequency calculation is performed on the fly, as opposed to looking-up predefined clock frequency schemes. In a typical flow, controller 88 accepts a request from host 28 to receive a certain target channel frequency. In response to the request, controller 88 identifies a set of clock frequencies that (i) cause little or no interference, and (ii) tune the receiver to the desired target channel frequency.

This sort of clock signal reconfiguration is particularly suitable for applications in which it is impractical to pre-define, and store in memory, a preferred clock frequency combination for each channel. Receiver 20 of FIG. 1, for example, covers a very large number of frequency bands and channels and has a large number of different clock signals. In such a configuration, storing predefined clock frequency combinations for the different channels would require an extremely large memory space, which is impractical in many mobile communication applications. On the fly calculation of the clock frequencies eliminates the need for such a-priori storage of predefined clock frequency settings.

In some embodiments, each of the clock signals has a predefined range of possible frequencies. Controller 88 searches over multiple combinations of possible clock frequencies, attempting to identify a set of clock frequencies that, once configured in PLLs 64, 72, 76, 80 and 84, tune to the desired target channel and reduce interference. Controller 88 may use various criteria for verifying whether or not a certain set of clock frequencies is expected to cause interference in signal reception. The criteria may also estimate the expected severity of the interference.

In some embodiments, controller 88 evaluates a certain set of clock frequencies by computing the frequencies of the harmonic products of these clock frequencies, and checking whether the frequency of any harmonic product falls within the input bandwidth of the receiver. If the evaluated set of clock frequencies does not produce harmonic products inside the receiver input bandwidth, it may be selected as the preferred set. Otherwise, the evaluated set is discarded.

In the context of the present patent application and in the claims, the term "harmonic product" refers to any signal that is produced by a linear or non-linear operation from one or more of the clock signals. As such, the frequencies of harmonic products comprise linear combinations of the frequencies of one or more of the clock signals. For three clock signals denoted x(t), y(t) and z(t), for example, harmonic products may comprise signals of the form $x(t)^m \cdot y(t)^n \cdot z(t)^l$, $m,n,l \in \{0,1,2,..\}$. In other words, harmonic products may comprise the fundamental clock signals, harmonics of the clock signals and inter-modulations between the clock signals. The frequencies of such harmonic products would be of the form $\pm m \cdot f_x + n \cdot f_y + l \cdot f_z$, wherein $f_x$, $f_y$ and $f_z$ denote the frequencies of clock signals x(t), y(t) and z(t), respectively.

The harmonic order of such a product is given by the sum of the powers of the clock signals (m+n+l in the above example). In some embodiments, controller 88 evaluates the harmonic products only up to a predefined harmonic order, e.g., evaluates harmonic products up to the third, fifth or seventh order. Typically, high-order products are small in amplitude and are not expected to cause considerable interference even if they fall in-band. Therefore, it is often permissible to neglect harmonic products above a certain order, and as a result to simplify and expedite the computation. The maximum harmonic order that is evaluated by controller 88 may be determined using any suitable method, e.g., using a-priori lab measurements or simulations.

Controller 88 may carry out an exhaustive search over the possible clock frequency combinations, until reaching a set that meets the predefined interference criterion. Typically, the search progresses in increasing order of harmonic product order. A listing of example software code that implements a search process of this kind is reproduced further below.

In the above description, controller 88 verifies that the harmonic products of the selected set of clock frequencies do not fall in the receiver input bandwidth. In alternative embodiments, the controller may verify that the products do not fall in any other predefined frequency band of interest.

Note that some of the clock signals whose frequencies are configured by controller 88 are not necessarily used directly in the signal reception and demodulation. For example, in some embodiments host interface 60 can be configured to communicate with host 28 at different clock rates. In an example embodiment, a receiver chip that implements receiver 28 supports multiple host interfaces, such as Universal Serial Bus (USB) and Serial Peripheral Interface (SPI). The clock signal of each such interface may cause interference in reception, and each of the clock signals may be configured to reduce this interference, as explained above.

In some embodiments, controller 88 suspends communication with host 28 when the clock signal of host interface 60 is about to be modified. This technique prevents communication failures with host 28 that may be caused by interface clock modification. After the clock signal of host interface 60 is changed, controller 88 resumes normal communication with the host.

As noted above, in some embodiments ADC 48 comprises a Σ/Δ ADC that operates at a high sampling rate. The high sampling rate increases the likelihood that the sampling clock of ADC 48 may cause interference in reception. This interference can be reduced or eliminated using the disclosed techniques.

In some embodiments, controller 68 may configure the division factor of divider 68, either in addition to or instead of configuring LO PLL 64. Thus, in the present context, any configuration of PLL 64 and/or divider 68 is regarded as a configuration of the clock source that generates the LO signal.

Reception Method Description

Figure 2:
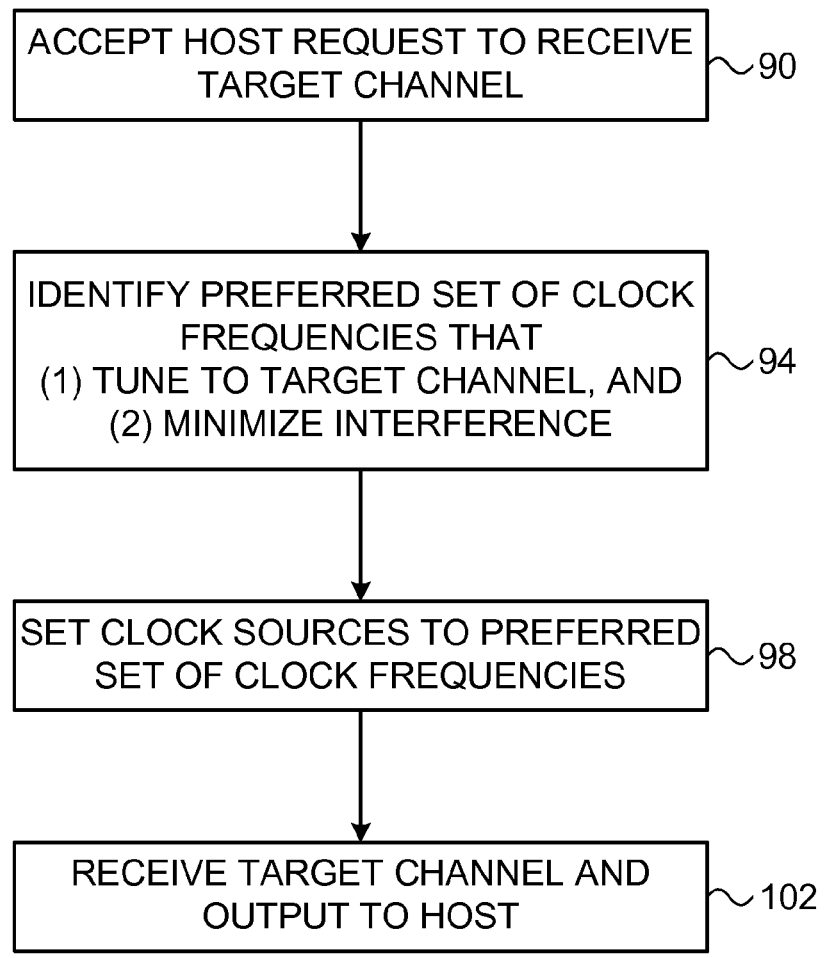
FIG. 2 is a flow chart that schematically illustrates a method for reception using configurable clock frequencies, in accordance with an embodiment of the present invention.

FIG. 2 is a flow chart that schematically illustrates a method for reception using configurable clock frequencies, in accordance with an embodiment of the present invention. The method begins with receiver 20 accepting a request to receive a certain target channel frequency, at a request step 90. In the present example, the request is accepted from host 28. In alternative embodiments, the request may originate from any other suitable source. In response to the request, controller of receiver 20 identifies a preferred set of clock frequencies, at a frequency computation step 94. The preferred set of clock frequencies is selected so as to (i) tune receiver 20 to the requested target channel, and (ii) reduce or eliminate interference in reception.

Controller 88 configured the clock sources of receiver 20 (PLLs 64, 72, 76, 80 and 84, or a subset of these PLLs) to generate the clock signals having the preferred set of clock frequencies, at a configuration step 98. Receiver 20 then receives the target channel using the configured clock signals, at a reception step 102. Since the clock frequencies were configured so as to minimize interference, reception at step 102 is likely to succeed. Receiver 20 outputs the data extracted from the target channel to host 28.

Example Code Listing

The C-language source code listed below can be executed by controller 88 of receiver 20, in accordance with an embodiment of the present invention. This example corresponds to a UHF-only MDTV receiver. The code carries out a search process for a preferred set of clock frequencies whose harmonic products do not fall inside the receiver's input bandwidth, as explained above.

The listing below includes two functions, such that the second function calls the first function. The variable "INITIAL_TRL_NOMINAL_RATE" is a 23-bit register that determines the output frequency of resampler 52 of FIG. 1. The clock rate at the output of resampler 52 is denoted Fe, and is given by Fe Fadc·INITIAL_TRL_NOMINAL_RATE/$2^{23}$, wherein Fadc denotes the sampling rate of ADC 48 (the clock frequency of "ADC CLK" in FIG. 1).

```
void DspLoops_FindAdequateClocks(UINT32 freq, UINT8 bw);
extern volatile SmsSysGlobals_ST x_SmsSysGlobals;
SmsPllConversionEntry_ST px_conv_entry;
INT32 dspLoops_FindAdequateClocksLoop(UINT32 freq, INT32
bw_Hz, UINT32 max_freq_harmony, INT32 clk_Hz, INT32
clock_bias, INT32 clk_M_step,INT32 clk_div, UINT32
log_str)
{
    UINT32 i, j;
    UINT32 Max_harmony = (UINT64)max_freq_harmony*
(UINT64)freq/(UINT64)clk_Hz + 1;
    for(j = 1;j <= Max_harmony; j++)
    {
        for(i = 1;i <= max_freq_harmony; i++)
        {
            INT32 freq_diff = ((UINT64) (freq*i)–
(UINT64)(clk_Hz*j));
            if(SMS_ABS(freq_diff) < (bw_Hz/2))
            {
                if (freq_diff >= 0)
                {
                    clock_bias = –clk_M_step;
                }
                else
                {
                    clock_bias = clk_M_step;
                }
            // ADC harmonic is (j). If ADC
            // harmonic is fourth or above.
            // A shift of 1MHz will suffice to
            // get out of BW.
            // If ADC harmonic is less than 4,
            // need to shift by 2MHz.
            // If ADC harmonic is less than 2,
            // need to shift by 4MHz. But this
            // cannot happen in UHF
            // (First problematic freq in UHF is
            // 480MHz, which is 2nd harmonic.)
            // Because dem clock is 1/5 of the
            // ADC in its case each step is 1/5
            // of the adc_clk_M_step so we
            // multiply by the div.
            if ((j*clk_M_step)<(clk_div*(bw_Hz/2–
```

-continued

```
SMS_ABS(freq_diff))))
                    {
                            clock_bias *= 2;
                    }
                    if(log_str == 1111)
                    {
                            LOG_DEBUG5(STR_TAG_FIND_ADEQUATE,
                                freq_diff,
                                freq,
                                i,
                                j,
                                clock_bias);
                    }
                    LOG_DEBUG5(log_str,
                                freq_diff,
                                freq,
                                i,
                                j,
                                clock_bias);
                    return clock_bias;
                }
            }
        }
        return clock_bias;
}
void DspLoops_FindAdequateClocks(UINT32 freq, UINT8 bw)
{
        INT32 sys_clk_Hz = DemodParamsEXT.NominalSysClockHz;
        INT32 bw_Hz = (8000000−1000000*bw);
        INT32 adc_clk_Hz = 2*bw_Hz*15;
        INT32    dem_clk_Hz    =    ((adc_clk_Hz/
(SMS_REGV_CLKGEN_DEM_SCALE_F&0xFFFF))/2)*((SMS_REGV_CLKGE
N_DEM_SCALE_F>>16)&0xFF);
        INT64   round_div_adc    =    (freq+(adc_clk_Hz>>1))
/adc_clk_Hz;
        INT64   round_div_sys    =    (freq+(sys_clk_Hz>>1))
/sys_clk_Hz;
        INT32 sys_clock_bias=0;
        INT32 adc_clock_bias=0;
        UINT32 ADCclockMHz;
        INT32   factor2   =   (freq<=(UINT32)1000000000)    ?
(2):(1);
        INT32 sys_clk_M_step;           // These values
                                        // represent how much
                                        // the clock changes
                                        //(in Hz) when only
                                        // the M value changes
        INT32 adc_clk_M_step;
        UINT8 p111_n;
        UINT8 p112_n;
        UINT8 p111_p;
        UINT8 p112_p;
        hal_clkpm_get_table(bw, &px_conv_entry);
        p112_n = px_conv_entry.p112_n;
        p112_p = px_conv_entry.p112_p;
        p111_n = px_conv_entry.p111_n;
        p111_p = px_conv_entry.p111_p;
        sys_clk_M_step    =    (x_SmsSysGlobals.n_sys_osc_freq/
(p112_n*p112_p));
        if((p111_p == 0) | | (p111_n == 0))
        {
            // Only PLL2 is used for both system and demod
            adc_clk_M_step = sys_clk_M_step;
        }
        else
        {
            // PLL2 used for system, PLL1 for demod
            adc_clk_M_step                    =
(x_SmsSysGlobals.n_sys_osc_freq/(p111_n*p111_p));
        }
        UINT32 max_freq_harmony = (freq > 1000000000) ? 1 :
5;
        adc_clock_bias                    =
dspLoops_FindAdequateClocksLoop(freq,    bw_Hz,
max_freq_harmony,    adc_clk_Hz/2,           adc_clock_bias,
adc_clk_M_step, 2, STR_TAG_CMMB_ADC_INFO2);
        if(adc_clock_bias == 0)
        {
            max_freq_harmony = 1;
            adc_clock_bias                    =
```

-continued

```
dspLoops_FindAdequateClocksLoop(freq,         bw_Hz,
max_freq_harmony,    dem_clk_Hz,              adc_clock_bias,
adc_clk_M_step, 5, 1111);        // in case of dem clock we
                                 // use the ADC/5 so instead
                                 // of dividing M_step by 5
                                 // we multiply the BW by 5
    }
    max_freq_harmony = (freq > 1000000000) ? 1 : 3;
    sys_clock_bias                              =
dspLoops_FindAdequateClocksLoop(freq,         bw_Hz,
max_freq_harmony,    sys_clk_Hz,              sys_clock_bias,
sys_clk_M_step, 1, STR_TAG_CMMB_ADC_INFO3);
#ifdef CMMB_CRYSTAL_26_MHZ
    if ((adc_clock_bias < 0) && (adc_clock_bias >=-
1000000))
    {
        adc_clock_bias = -1000000;
    }
    else if ((adc_clock_bias > 0) && (adc_clock_bias <=
1000000))
    {
        adc_clock_bias = 1000000;
    }
#endif
    ADCclockMHz  =  (UINT32)((bw_Hz*30+adc_clock_bias)
/1000000);
#ifdef CMMB_6MHz_BW
    INITIAL_TRL_NOMINAL_RATE   =   ((10*15*2*6/8)<<22)/
(ADCclockMHz);
#else
    INITIAL_TRL_NOMINAL_RATE      =   ((10*15)<<23)/
(ADCclockMHz);
#endif
    set_trl_nomrate(INITIAL_TRL_NOMINAL_RATE);
    if (adc_clock_bias!=0)
    {
        px_conv_entry.p111_m=(UINT16)((bw_Hz*30+adc_clock_bi
as)/adc_clk_M_step);
    }
    if (sys_clock_bias!=0)
    {
        px_conv_entry.p112_m=(UINT16)(((sys_clock_bias+sys_c
lk_Hz))/sys_clk_M_step);
        px_conv_entry.sys_clk += sys_clock_bias/10000;
    }
    if
((x_SmsSysGlobals.n_sys_clk==(sys_clock_bias+sys_clk_Hz))
&&(DemodParamsEXT.AdcClockBias==adc_clock_bias)&&(bw==Dem
odParamsEXT.RFbw))
    {
        // no need to change clock, current clocks ok.
        return;
    }
    DemodParamsEXT.AdcClockBias=adc_clock_bias;
    LOG_DEBUG8(STR_TAG_CMMB_ADC_INFO4,
        (UINT32)freq,
        bw,
        (sys_clock_bias+sys_clk_Hz),
        (bw_Hz*30+adc_clock_bias),
        0,
        0,
        (-bw_Hz/2),
        ((10*15)<<23)/(ADCclockMHz));
    common_tx_protect_lock( );
    hal_clkpm_new_ram(&px_conv_entry);
    common_tx_protect_unlock( );
}
```

Although the embodiments described herein mainly address MDTV receivers, the methods and systems described herein can also be used in other types of communication equipment, such as in Wireless Local-Area Network (WLAN) receivers, Digital Subscriber Line (DSL) receivers, cellular communication receivers, Ultra-Wideband (UWB) receivers, and many others.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method, comprising:
in a receiver that operates using multiple clock signals having respective clock frequencies, including a Local Oscillator (LO) signal that down-converts an input Radio Frequency (RF) signal and one or more digital clock signals used in processing the down-converted signal, accepting a request to receive the input RF signal on a target channel frequency;
in response to the request, calculating a preferred frequency for the LO signal that, when applied by the receiver in combination with preferred frequencies calculated for the digital clock signals, will cause the receiver to tune to the target channel frequency while satisfying a predefined criterion relating to interference caused by the clock signals; and
receiving the target channel frequency by setting the clock signals to the preferred clock frequencies.

2. The method according to claim 1, wherein calculating the preferred clock frequency comprises executing, in response to the request, software code that searches over multiple combinations of the clock frequencies in order to identify the preferred clock frequencies.

3. The method according to claim 1, wherein calculating the preferred clock frequency comprises evaluating frequencies of harmonic products of one or more of the clock frequencies, and verifying that the frequencies of the harmonic products meet the predefined criterion.

4. The method according to claim 1, wherein the predefined criterion specifies that all harmonic products of one or more of the clock frequencies, up to a given harmonic order, fall outside a predefined bandwidth of interest.

5. The method according to claim 4, wherein the predefined bandwidth of interest comprises an input bandwidth of the receiver.

6. The method according to claim 1, wherein calculation of the preferred clock frequencies is performed without a-priori storage of potentially preferred clock frequencies before accepting the request.

7. The method according to claim 1, wherein the receiver is fabricated on a single semiconductor die.

8. The method according to claim 1, wherein the receiver is fabricated on two or more semiconductor dies that are packaged in a single device package.

9. The method according to claim 1, wherein the digital clock signals comprise at least one signal type selected from a group of types consisting of:
a sampling clock used for sampling in an Analog to Digital Converter (ADC);
a demodulation clock used for signal demodulation; and
a system clock used for clocking digital circuitry in the receiver.

10. The method according to claim 1, wherein the clock signals comprise a clock of an interface for communicating with a host, and wherein calculating the preferred clock frequency and setting the preferred clock frequencies comprise modifying the clock of the interface in order to meet the predefined criterion.

11. The method according to claim 10, wherein modifying the clock of the interface comprises suspending communication with the host over the interface during modification of the clock of the interface.

12. The method according to claim 1, wherein setting the preferred clock frequencies comprises setting a division factor of a divider that produces the LO signal in the receiver.

13. The method according to claim 1, wherein the receiver comprises a Mobile Digital Television (MDTV) receiver, and wherein receiving the target channel frequency comprises receiving a requested television channel.

14. A receiver, comprising:
one or more clock sources, which are configured to produce multiple clock signals at respective clock frequencies, including a Local Oscillator (LO) signal that down-converts an input Radio Frequency (RF) signal and one or more digital clock signals used in processing the down-converted signal;
reception circuitry, which is configured to receive signals using the clock signals; and
a processor, which is configured to accept a request to receive the input RF signal on a target channel frequency, to calculate in response to the request a preferred frequency for the LO signal that, when produced by the clock sources in combination with preferred frequencies calculated for the digital clock signals, will cause the reception circuitry to tune to the target channel frequency while satisfying a predefined criterion relating to interference caused by the clock signals, and to set the clock sources to the preferred clock frequencies, so as to receive the target channel frequency.

15. The receiver according to claim 14, wherein the processor is configured to execute, in response to the request, software code that searches over multiple combinations of the clock frequencies in order to identify the preferred clock frequencies.

16. The receiver according to claim 14, wherein the processor is configured to calculate the preferred clock frequencies by evaluating frequencies of harmonic products of one or more of the clock frequencies, and verifying that the frequencies of the harmonic products meet the predefined criterion.

17. The receiver according to claim 14, wherein the predefined criterion specifies that all harmonic products of one or more of the clock frequencies, up to a given harmonic order, fall outside a predefined bandwidth of interest.

18. The receiver according to claim 17, wherein the predefined bandwidth of interest comprises an input bandwidth of the receiver.

19. The receiver according to claim 14, wherein the processor is configured to calculate the preferred clock frequencies without a-priori storage of potentially preferred clock frequencies before accepting the request.

20. The receiver according to claim 14, and comprising a single semiconductor die, wherein the clock sources, the reception circuitry and the processor are fabricated on the single semiconductor die.

21. The receiver according to claim 14, and comprising two or more semiconductor dies that are packaged in a single device package, wherein the clock sources, the reception circuitry and the processor are fabricated on the two or more semiconductor dies.

22. The receiver according to claim 14, wherein the digital clock signals comprise at least one signal type selected from a group of types consisting of:
a sampling clock used for sampling in an Analog to Digital Converter (ADC);
a demodulation clock used for signal demodulation; and
a system clock used for clocking digital circuitry in the receiver.

23. The receiver according to claim 14, wherein the reception circuitry comprises an interface for communicating with a host, wherein the clock signals comprise a clock of the interface, and wherein the processor is configured to modify the clock of the interface in order to meet the predefined criterion.

24. The receiver according to claim 23, wherein the processor is configured to suspend communication with the host over the interface during modification of the clock of the interface.

25. The receiver according to claim 14, wherein the clock sources comprise a divider that produces the LO signal, and wherein the processor is configured to set the preferred clock frequencies by setting a division factor of the divider.

26. The receiver according to claim 14, wherein the receiver comprises a Mobile Digital Television (MDTV) receiver, and wherein the target channel frequency comprises a requested television channel.

27. A method, comprising:
accepting a request to receive a target channel frequency in a receiver that operates using multiple clock signals having respective clock frequencies, including at least first and second digital clock signals that are used by digital circuitry of the receiver and whose clock frequencies are produced respectively by different first and second Phase Locked Loops (PLLs);
in response to the request, calculating a set of preferred clock frequencies, including at least first and second clock frequencies to be produced respectively by the first and second PLLs for the first and second digital clock signals, which when applied by the receiver will cause the receiver to tune to the target channel frequency while satisfying a predefined criterion relating to interference caused by the clock signals; and
receiving the target channel frequency by setting the clock signals to the preferred clock frequencies.

28. A receiver, comprising:
one or more clock sources, which are configured to produce multiple clock signals having respective clock frequencies, including at least first and second different Phase Locked Loops (PLLs) that are configured to produce respective first and second digital clock signals for use by digital circuitry of the receiver;
reception circuitry, which comprises the digital circuitry and is configured to receive signals using the clock signals; and
a processor, which is configured to accept a request to receive a target channel frequency, to calculate in response to the request a set of preferred clock frequencies, including at least first and second clock frequencies to be produced respectively by the first and second PLLs for the first and second digital clock signals, which when produced by the clock sources will cause the reception circuitry to tune to the target channel frequency while satisfying a predefined criterion relating to interference caused by the clock signals.

* * * * *